Figure 1:
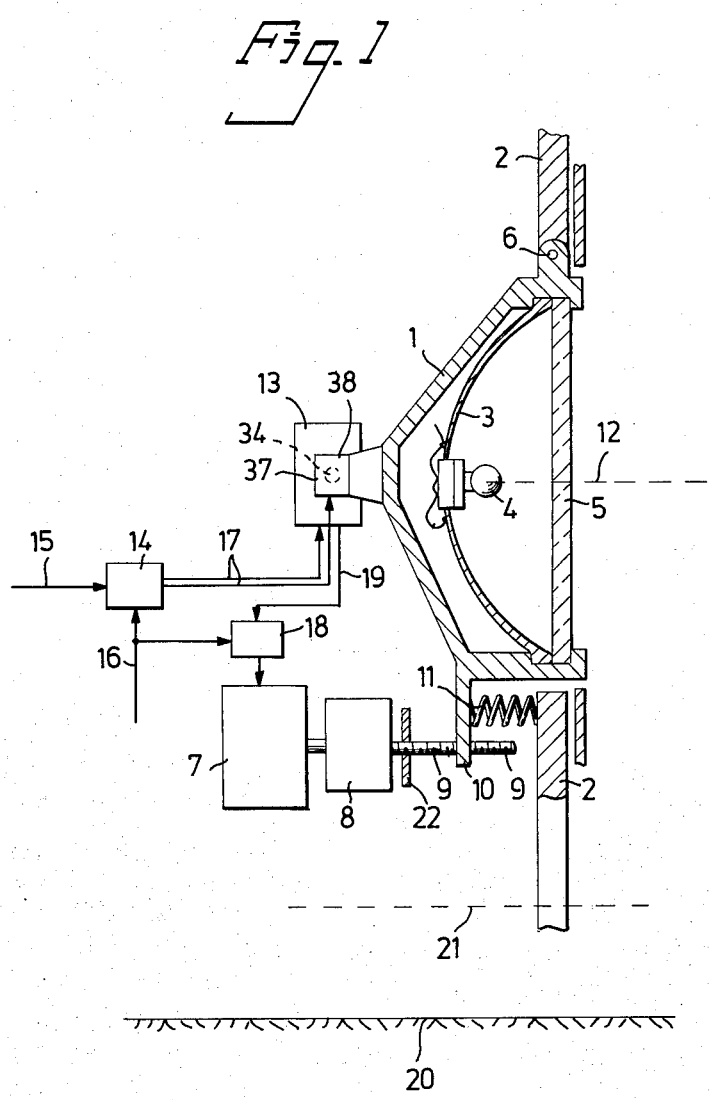

United States Patent [19]

Bergkvist

[11] 4,217,631
[45] Aug. 12, 1980

[54] DEVICE FOR ADJUSTING AN OBJECT TO ASSUME A PREDETERMINED ANGLE TO A CERTAIN PLANE

[76] Inventor: Lars A. Bergkvist, Gottne, 890 42 Mellansel, Sweden

[21] Appl. No.: 840,891

[22] Filed: Oct. 11, 1977

[30] Foreign Application Priority Data

Oct. 15, 1976 [SE] Sweden ............................. 7611514

[51] Int. Cl.$^2$ ............................................. F21V 7/00
[52] U.S. Cl. ................................. 362/348; 362/66; 362/323; 362/324; 362/338
[58] Field of Search ................. 362/66, 322, 324, 325, 362/336, 338, 347, 348, 367, 371, 372

[56] References Cited

U.S. PATENT DOCUMENTS

| 1,603,410 | 10/1926 | Ridlington | 362/66 |
| 4,100,592 | 7/1978 | Henkel et al. | 362/288 |

*Primary Examiner*—Benjamin R. Padgett
*Assistant Examiner*—J. L. Barr
*Attorney, Agent, or Firm*—Silverman, Cass & Singer, Ltd.

[57] ABSTRACT

A device for adjusting the angular disposition of a first object with respect to a plane. The first object is adjustably attached to a second object resting on said plane. The adjustment occurs when there is a change in the angular disposition between the second object and the plane. Two freely rotatable members are attached to the first object adjacent each other. Both members are rotatable in a direction parallel to the angle to be adjusted between the first object and the plane, and each member has a rotary rest position determined by its respective center of gravity. During the change in the angular disposition between the second object and the plane, one of the two members is rotationally fixed with respect to the second object and is rotated from its rest position according to the change in the angular disposition between the second object and the plane. The other of the two members remains in its rest position during the change in the angular disposition between the second member and the plane. An indicator senses the change in rotational position between the two members and controls an adjuster to move the first object and the second object relative to each other to rotate the second member back to its rest position.

7 Claims, 10 Drawing Figures

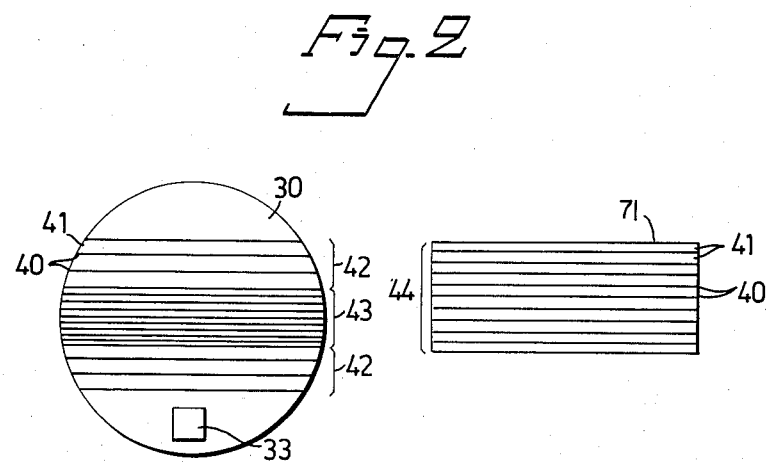
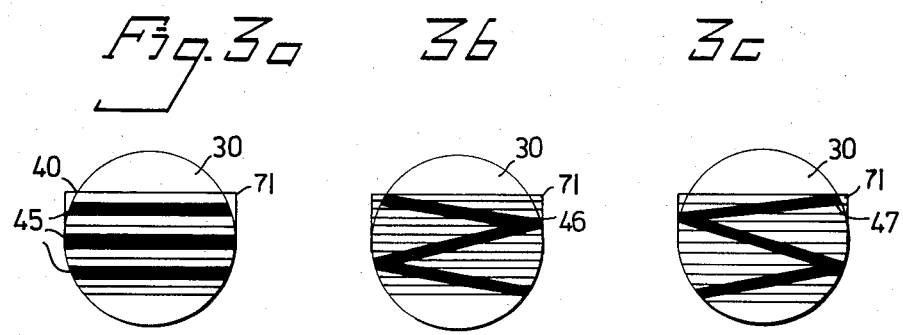
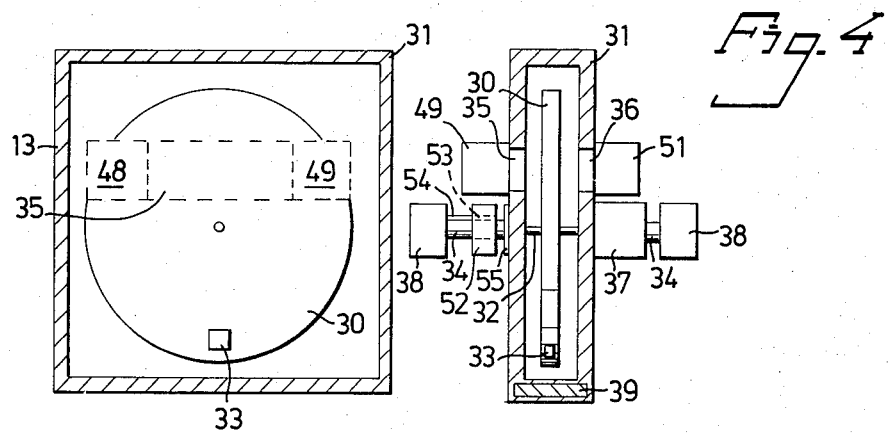

DEVICE FOR ADJUSTING AN OBJECT TO ASSUME A PREDETERMINED ANGLE TO A CERTAIN PLANE

This invention relates to a device for adjusting an object so that it assumes a predetermined angle to a certain plane. The device can be utilized for adjusting arbitrary objects to arbitrary planes, but its special application is for adjusting headlights on vehicles, for example cars, so as to assume a predetermined angle to the roadway.

At present the headlights of a car are adjusted to assume an angle to the horizontal plane at the occasion of adjustment, which angle corresponds to a certain angle, and therewith to a certain position, in relation to the car body. The position of the headlights adjusted relative to the car body is maintained until the next adjustment is made. The adjusted position is such that the dimmed headlights of the car do not shine above a certain horizontal level in order not to dazzle oncoming traffic. The adjusting of the angle, and therewith the position, is made with an accuracy of about 1°. The adjustment is made with a certain assumed load to which the car will be exposed. The load of a car, however, varies very substantially a.o. depending on the number of passengers, the luggage weight and its position, and the amount of fuel in the tank. Different loads give rise to different angles between the headlights and the horizontal plane, and the angle of the headlights to the horizontal plane will deviate from the predetermined angle to which the headlights previously have been adjusted. A very small increase in load or a very small decrease give rise to a deviation of said angle from said predetermined angle which is greater than the accuracy with which the predetermined angle has been adjusted. A moderate increase in load, for example in a rear luggage space, results for most cars in the dimmed headlights shining above said horizontal level, and there is a risk that oncoming traffic will be dazzled with possible serious consequences.

The headlight adjustment is carried out with a special equipment and, therefore, the work must be carried out in a service shop or the like. This implies that it practically is not possible to adjust the light every time the car is exposed to a change in load, even if this would be highly desirable.

The present invention solves the aforesaid problem. The invention relates to a device for adjusting a first object, for example a headlight, which is adjustably attached to a second object, for example a car, to form a predetermined angle to a plane, for example a roadway, on which said second object is located, independently of the angle of the longitudinal axis of said second object to said plane, which device is independent of the angle formed by said plane to the horizontal plane at the adjustment occasion, which first object at a certain occasion has been calibrated to assume said predetermined angle.

The invention is characterized thereby that the device includes two members adapted to adjust themselves to a certain rotary position relative to each other and to the vertical line, a second one of said members, being temporarily lockable relative to the first object; and an adjuster for adjusting the position of the first object in relation to said second object, said two members at an adjusting occasion being adapted to first assume said position relative to the vertical line, whereafter said second member is locked or fixed by a lock relative to the first object, and at a change of the angle of the longitudinal axis of said second object to said plane said first object is moved to assume a position relative to said second object by action of said adjuster, in such a manner, that said certain rotary position is achieved between said first and said second member.

The invention is described in the following, with reference to the accompanying drawings, in which FIG. 1 is a block diagram of the device in connection with a headlight of a car, FIG. 2 shows two screen discs, FIGS. 3a-3c show interference patterns arising by means of the screen discs shown in FIG. 2, FIG. 4 shows a device comprising screen discs, FIGS. 5a-5d show the device schematically in different situations.

In FIG. 1 a block diagram of the device according to the invention is shown in connection with a headlight, for example of a car. In FIG. 1 the numeral 1 designates the first object exemplified by the holder of a headlight insert comprising a reflector 3, a light-bulb 4 and a headlight lens 5, and the numeral 2 designates the second object exemplified by a detail rigidly connected to a car body.

The first object 1 is hingedly connected to the second object via a joint 6. An adjuster is provided to adjust the position of the first object relative to the position of the second object, which adjuster includes an electric motor 7 adapted via a gear 8 to drive a threaded axle 9 extending in a threaded hole in a tongue 10 associated with said first object 1. In order to achieve high precision, a helical spring 11 is attached between the tongue 10 and said second object 2. When the motor 7 drives the axle 9 in one or the other direction, the tongue 10 is moved, and therewith the lower portion of the headlight holder is moved to and from the lower portion of said second object 2. Hereby the angle between the optic axis 12 of the headlight and the second object 2 will be changed. There is further shown the indicator 13 for indicating the necessary adjustment to be carried out with respect to the position of the first object in relation to the second object in order to achieve that the first object forms a certain angle with the aforesaid plane. This device is described in greater detail below.

A device for starting and stopping, respectively, an adjustment period, designated by 14, comprises a switch, preferably in the form of a relay, and includes a device (not shown) adapted to receive a signal indicating when an adjustment period is to be started and stopped, respectively, via the conductor 15. Even a manual influence on the position in time of the adjustment period is possible thereby that an impulse is supplied to the indication means via the conductor 15. The starting and stopping means receives electric voltage via a cable, for example from the battery of the car, which voltage is transferred by action of said switch to the indicator 13 via a conductor 17. The indicator 13, controls, via a conductor 19, a switch 18, for example a relay, which applies and removes the voltage to the motor 7 and reverses the polarity of the voltage so as to render possible the choice of the direction of rotation of the motor.

The indicator 13 is hingedly connected to the first object 1, which in the present example is the headlight holder. The indicator 13 in the present example is intended to measure a relative change of angle between the optic axis 12 of the headlight and the plane on which the car is located, i.e. a roadway designated by 20, and thereby to actuate the adjuster 18,7–11,6 so, that the optic axis 12 of the lamp forms a certain predetermined angle with the roadway 20, independently of the angle of the above-mentioned longitudinal axis 21 of the second object to the roadway 20.

At a certain occasion the position of the first object 1 in relation to the second object 2 is calibrated, so that the optic axis 12 forms said predetermined angle with the plane 20. A change of the angle then occurs thereby that a wheel 22 rigidly connected to the axle 9 is turned whereby the position of the holder 1 in relation to the detail 2 is changed.

In FIG. 4 the indicator 13 is shown, which includes said first and said second member, where the first one of said members is a disk 30 rotable about a horizontal axle. The gravity point of the disk 30 is located outside the rotation center of the disk, for example, a weight 33 is positioned close to the periphery of the disk 30. The second one of said members includes a housing 31 enclosing the disk and filled with a damping medium, for example oil. The housing 31 is rotatable in relation to the first object 1 about two axle journals 34, which are attached on a fork 38 extending from the first object 1. The gravity point of the housing 31 is located outside its center of rotation, for example, a weight 39 is positioned in the bottom wall of the housing. In two of the walls of the housing 31 transparent windows 35, 36 are provided. There is further provided a lock for fixing the rotary position of the housing 31 in relation to the first object 1. The lock includes an electromagnet 37 positioned axially aligned with the axis of rotation of the disk 30 and housing, which electromagnet is adapted to actuate a sleeve 52 of magnetic material located on one suspension axle journal 34 of the housing 31. The journal is rigidly mounted to the first object, on a side of the journal opposite the housing 31 relative to the electromagnet 37. The sleeve 52 is movable, but not rotatable on said axle 34. The sleeve is provided with an axially directed groove 53, in which a cam 54 directed axially on the axle runs.

By action of the magnetic field of the electromagnet 37 the sleeve 52 is pressed against a friction surface 55 fastened on the housing 31, whereby the housing is fixed in its current rotary position in relation to the fork 38, and therewith to the first object 1, i.e. the headlight holder.

Said two members, i.e. the disk 30 and housing 31, are provided each with one or more screens consisting of opaque lines 40 separated by transparent interspaces 41, see FIG. 2. In FIG. 2 the screens are shown only schematically. The screen disk 71 of the housing 31 is located in the window 36. In the following, the screen disk of the housing is designated by 71. Upon lighting through two such screens, characteristic interference patterns arise, depending on the rotary position, so-called moiré patterns, as described in principle in the Swedish Pat. Specification No. 7307577-2. According to a preferred ambodiment, one of the two members 30 is provided with a screen having a different division, i.e. a different number of opaque lines per length unit perpendicular to the lines, than the screen of the second one of the two members, seen in a direction perpendicular to the surfaces of the disks when the disks relative to each other are in the position relative to the vertical line which is determined by said weights 33,39 and the axis of rotation 32, 34. According to a preferred embodiment, one member 30 is provided with two types of screens 42, 43 of which one 42 has a more sparse division than the second one 43. Said second member is provided with a screen 44 having a division lying between the division of said two screens 42,43. The screens, further, are such that all opaque lines 40 have the same width, and the distance between the lines is smaller than the width of the lines. The width of the opaque lines 40 may, for example, be 0.6 mm. The distance between the lines in the sparsest screen can be 0.4 mm, in the densest 0.2 mm and in the intermediate screen 0.3 mm. These measures, of course, can be varied.

When the two screen discs 30, 71 are axially aligned with each other so that the weights 33,39 are located adjacent each other, and have a light shown through them, an interference pattern arises which consists of a few wide dark bands 45 which are in parallel with the opaque lines 40, see FIG. 3. In the FIGS. 3a–3c the screens are shown only schematically. The position of the screens relative to each other is in the following called the zero position.

When the screen disks 30,71 have a light shown through them by a lighting source, an interference pattern arises which substantially consists of a Z when the two screen disks are rotated in relation to each other from said zero position. Provided, that the lighting source is located to the right of the screen disks and viewed from the left in FIG. 4, when the screen disk 30 closest to the viewer is rotated clockwise relative to the screen disk 71 closest to the lighting source, a Z 46 arises with the upper point to the left, see FIG. 3b. With a counterclockwise rotation a Z 47 with the upper point to the right arises, see FIG. 3c. Thus, said interference patterns provide information on how the two disks are rotated in relation to each other.

For reading the rotary relation of the disks 30,71 relative to each other by viewing the interference patterns, in the two ends of said rectangular windows 35, 36 a reader is provided. At each end of one window 35 a phototransistor 48,49 or the like is provided. At each end of the second window 36 a light diode or the like 51 is provided, of which only the light diode 51 is shown. The first and second phototransistors 48 and 49, respectively, are aligned to cooperate with one and the other, respectively, of the light diodes. The light diodes 51 generate light through the screen disks 71, 30 whereby the associated phototransistors 48, 49 become conductive when the light passes through the screen disks and become non-conductive when a dark band 45,46,47 prevents the light from meeting the respective phototransistor 48,49. The light diodes 51 and phototransistors preferably are located in relation to the disks 30,71 that, when these are in said zero position, the scanned area is located close to the periphery of the disks and have as their center the upper transition in FIG. 2 between the two screen types 42,43 on the screen disk 30. Hereby, thus, one and the other, respectively, of the phototransistors will be met by a greater and smaller amount, respectively, of light when the position of the disks deviates from the zero position, because a greater area will become transparent for the light from one light diode than for the light from the second light diode, depending on the Z-shaped interference pattern formed thereby.

The two phototransistors 48,49 preferably are electrically connected to a per se known electric circuit, in which the current through each of the phototransistors is compared, and which circuit emits a signal. The conductor 19 transfers the signal to the switch 18, which, depending on which phototransistor the current intensity is greatest, is moved to a position so that the motor 7 rotates in one direction. This implies that an error arising in the angle between the optic axis 12 and the roadway 20 decreases.

When there is no error in the angle, the same current intensity flows in both phototransistors, because the interference pattern then corresponds to the zero position, i.e. consists of wide parallel bands 45.

The function of the device is described below with reference to FIGS. 5a–5e. It is assumed that the first object 1 is calibrated so that, when the vehicle stands on a roadway 20, the optic axis 12 forms a certain predetermined angle with the roadway. This predetermined angle is indicated in FIGS. 5a–5e by the angle $\gamma_o$ between the optic axis 12 and the normal to the roadway where $\gamma_o$ is 90°.

Figure 5A:
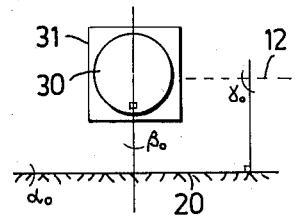

When the car stands on a horizontal road 20, FIG. 5a, the rotary position of the housing 31 as well as the rotary position of the disk 30 coincide with the vertical line, i.e. the vertical line passes through their respective centers of rotation and gravity. The two members 30,31 are in the zero position with a rotary relation to each other designated by the angle $\beta_o = 0°$. An example is chosen in this description that the car, for example, thereafter is stopped or parked on an up-grade where the roadway forms the angle $\alpha_1$ to the horizontal plane. The housing 31 during the driving preferably is freely movable or rotatable in relation to the headlight holder 1. When the car is on the up-grade, the lines passing through the center of rotation and gravity of the housing 31 and disk 30 then, of course, will coincide with the vertical line and, thus, form an angle relative to each other of $\beta_o$. As no change in the load of the car has occurred, said angle $\gamma$ still is $\gamma_o$. See FIG. 5b.

Figure 5B:
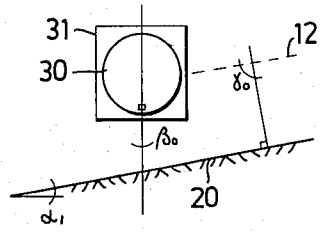
Figure 5C:
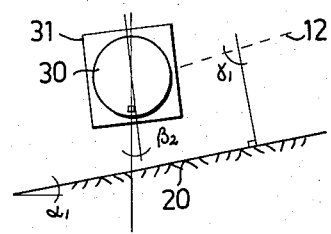

A signal to the starting device 14 results in current being supplied to the electromagnet 37 whereby the rotary position of the housing 31 relative to the headlight holder 1 is fixed in the position shown in FIG. 5b.

The car thereafter is assumed loaded with, for example, further luggage in its rear part which results in the rear portion of the car being lowered a distance to the roadway 20. Hereby, thus, the housing 31 is rotated through an angle $\beta_2$ relative to the vertical line, which angle corresponds to the change of angle of the longitudinal axis of the car to the roadway, and the optic axis will be directed upward through the corresponding same angle, i.e. to the angle $\gamma_1 = \gamma_o - \beta_2$, see FIG. 5c. This wrong angle formed by the optic axis to the roadway would remain as long as the original load condition of the car is restored, if not the adjustment stated below does not occur.

The disk 30 always assumes the vertical position, so that the rotary relation between the disk 30 and the housing 31 also is equal to the angle $\beta_2$.

Figure 5D:
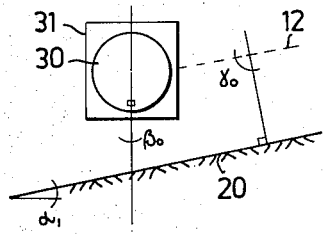

There is, thus, the angle $\beta_2$ also between the screen lines in the screens of the two members 30,31, which gives rise to a Z-shaped interference pattern 46,47 as mentioned above. As a result of the Z-shaped pattern one phototransistor 48,49 is met by a smaller amount of light than the second phototransistor 48,49 whereby, as mentioned above, the switch 18 is moved to such position such that the motor 7 starts rotating in a direction corresponding to the movement of the tongue 10 in one direction, whereby said error in the angle between the optic axis and the roadway decreases, i.e. the angle $\gamma_1$ decreases. Said movement of the tongue 10 results in that the headlight holder 1 and the housing 31, because their positions relative to each other are locked, perform a rotary movement relative to the vertical line, so that the angle $\beta_2$ decreases. The movement continues until the screen lines on the screens of the two members 30,31 are in parallel, i.e. relative to each other they form the angle $\beta_o = 0°$, because in this position both phototransistors are met by the same amount of light, because the interference pattern then consists of a uniform pattern consisting of wide bands 45 in parallel with each other, whereby the switch 18 breaks the current to the motor 8. In FIG. 5d the position thus achieved is shown. The mutual angle of rotation $\beta_o$ between the members 30,31 is 0°, which indicates that the optic axis again has assumed the predetermined angle to the roadway, designated with that the angle $\gamma_o = 90°$. Thereafter the entire device is shut down by action of the starting and stopping means 14, and the housing 31 again is freely movable in relation to the headlight holder 1.

The light adjustment now is correct although the car was loaded with additional luggage.

The next adjustment at a change of load proceeds in the same way.

An adjustment preferably is made every time the car is stopped. This can take place when the starting and stopping means 14 receives impulses from door contacts, contacts co-operating with gear shift or gear lever etc. The termination of an adjustment period is indicated preferably by an equal amount of current flowing in the phototransistors 48,49 and that, for example, a movement is carried out with the gear shift or the like. It also can be indicated if the car has some speed or not and using such information for controlling the starting and stopping means 14. When the loading situation of the car during an adjustment period is not changed, the two phototransistors all the time are met by an equal amount of light, and the switch 18, therefore, is not moved to such a position that the motor 7 is started.

The present invention, thus, offers a device to adjust a first object, which is adjustably attached on a second object, to form a predetermined angle to a plane, on which said second object is located, independently of the angle of the longitudinal axis of said second object to said plane. The device further is independent of the angle, which said plane forms to the horizontal plane at the occasion of adjustment. The device according to the invention, thus, has a great number of applications, of which the one stated above is to be regarded as one example.

A great number of modifications of the embodiment described in the above example can be made within the scope of the attached claims.

An indication, for example, of the position of the two members 30,31, i.e. the interference pattern, can be transferred via a fibre optic conductor, for example, to the instrument panel of a car for visual reading of the interference pattern. The axle 9 in this case is rotatable by a wheel on the instrument panel, or the axle 9 can be operated by means of the motor 8, which is controlled with a switch on the instrument panel. Also the electromagnet can be operated from the instrument panel.

The design of the screens can also be varied, as well as the design of the two members 30,31 and the design of the adjuster 7,8,9,10,11. The control system 14–19 described is given as an example and can be replaced by a system suitable for the object in question.

I claim:

1. A device for adjusting the angular disposition of a first object relative to a plane, the first object being adjustably fixed to a second object positioned on said plane, the adjustment of said first object occurring when there is a change in the angular disposition of the second object relative to the plane, the adjustment of said first object being variable independently of the angular disposition of the second object relative to the plane and of the angular disposition of the plane relative to horizontal, the angular disposition of the first object relative to the plane having been set to a predetermined angle prior to the change in the angular disposition of the second object relative to the plane, said device comprising, a first member coupled to the first object, said first member being freely rotatable in a direction substantially parallel to the angle to be adjusted between the first object and the plane, said first member having a center of gravity which determines a rotary position thereof relative to vertical when said first member is rotationally at rest, and said first member remaining in said rotary position during the change in the angular disposition of the second object relative to the plane;

a second member coupled to said first object, said second member being freely rotatable in a direction substantially parallel to said first member and being located adjacent said first member, and said second member having a center of gravity which determines a rotary position thereof relative to vertical and relative to the rotary position of said first member when said second member is rotationally at rest;

locking means fixed to said first object and coupled to said second member for temporarily fixing the rotation of said second member relative to said first object during a time substantially beginning with the change in the angular disposition of the second object relative to the plane and substantially ending with the adjustment of said angular disposition and the first object relative to the plane, said second member when in its fixed rotative disposition relative to said first object being rotated from its rotary position and relative to the rotary position of said first member by the change in the angular disposition of the second object relative to the plane;

indicator means coupled to said first member and said second member for producing a control signal in response to the difference in the rotational position of said second member relative to said first member;

adjustment means coupled to said first object, said second object and said indicator means, said adjustment means for adjusting said first object and said second object relative to each other in response to said control signal to return said second member to the rotary position thereof and to adjust the angular disposition of said first object relative to said plane to said predetermined angle.

2. A device as claimed in claim 1 in which said first member is a circular disk having a substantially horizontal axis of rotation, with the center of gravity of said disk being located outside said axis, and in which said second member is a housing enclosing the disk with said center of gravity of said housing being located outside of its axis of rotation.

3. A device as claimed in claim 2 in which said indicator means include a first screen attached to said disk and a second screen attached in one of two substantially coaxial openings through said housing, said first and second screens being substantially parallel with said disk, and being located adjacent each other when said disk and said housing respectively are in said rotary positions, said first and second screens each including opaque lines separated by transparent interspaces to produce moire interference patterns when light is passed through said first and second screens.

4. A device as claimed in claim 3 in which the number of opaque lines per unit of length in a direction normal to said lines is different.

5. A device as claimed in claim 3 in which said indicator means include reading means fixed on said housing on opposite sides of said first and second screens for reading said moire interference patterns through said first and second screens, said reading means including at least two light emitting diodes fixed on said housing on one side of said first and second screens, and further including at least two phototransistors fixed on said housing on the opposite side of said first and second screens from said emitting diodes, said emitting diodes each being arranged to cooperate with one of said phototransistors.

6. A device as claimed in claim 5 in which said indicator means include comparator means electrically coupled to said phototransistors for producing said control signal in response to the magnitude of the respective currents flowing through said phototransistors; and in which said adjustment means include an electric motor coupled to said comparator means, said motor having an output direction of rotation which is controlled by said control signal, and said adjustment means including screw means coupled to said motor, said first object and said second object, said screw means for moving said first object relative to said second object in response to said motor output.

7. A device as claimed in claim 2 in which said locking means include an electromagnet attached to said first object and axially aligned with said disk and said housing axis of rotation, said locking means further including a sleeve of magnetic material magnetically coupled to said electromagnet and encircling an axle coaxial with said housing axis of rotation, said axle being fixed on one end to said first object, and carrying on an opposite end said freely rotatable housing, said sleeve being rotationally fixed and slideable on said axle to allow said axle to press against said housing in response to said energized electromagnet to temporarily fix the rotary position of said housing relative to said first object.

* * * * *